Patented May 4, 1937

2,078,971

UNITED STATES PATENT OFFICE 2,078,971

PROCESS FOR THE MANUFACTURE OF POLISHING WAX COMPOSITIONS

John D. Pickens and Theodore Richard Thompson, Flint, Mich., assignors to E. I. du Pont de Nemours & Company, Wilmington, Del., a corporation of Delaware No Drawing. Application October 17, 1934, Serial No. 748,666

8 Claims. (Cl. 134—24)

This invention relates to an improved method for the manufacture of wax compositions and more particularly to an improved method for the manufacture of wax compositions used as polishes.

Wax compositions used for polishing various types of surfaces are composed essentially of a mixture of various waxes dissolved in suitable solvents or dispersing media. The polishing compositions are prepared usually by merely melting the waxes and the solvents together, or dissolving the waxes in the solvents, pouring into containers and allowing to cool.

In order to obtain a satisfactory consistency of the finished product, many complicated combinations of waxes and solvents are used. Most of the compositions require the use of turpentine as the solvent in order to obtain a satisfactory "set-up" of the finished product. Compositions prepared in this way do not consistently produce the most satisfactory polishes in that they are often of a grainy texture which is objectionable from a use standpoint, and further they do not yield a product of particularly pleasing appearance in the container from the standpoint of smoothness and glossy surface.

This invention has as an object the provision of a process for the preparation of polishing wax compositions having a homogeneous body texture and a smooth glossy surface.

A further object is the provision of a method for manufacturing polishing wax compositions in which the less costly aliphatic hydrocarbons may be used as solvents or dispersing media for the waxes in place of the more expensive spirits of turpentine which is also not entirely satisfactory on account of its odor.

These objects are accomplished in the present invention by a process for manufacturing wax polishing compositions in which the mixing of the solid and liquid ingredients of the composition is carried out under controlled temperature conditions and the resulting mixture allowed to cool and solidify under definitely controlled temperature conditions so as to produce a finished product of homogeneous body texture and a smooth and glossy surface in the container.

The process of the invention may be carried out in two principal stages: (1) the step of incorporating the various ingredients into a liquid mixture of melted waxes and dispersing media; (2) the step of cooling the mixture after pouring into suitable containers. Careful attention to the details of both steps is of importance in order to obtain a firm finished product having a glossy appearance in the container.

The first step of the process consists of melting the wax or waxes and heating to such a temperature so that when added to the cold solvent or dispersing media and stirred, the resulting mixture will have a temperature of about 60° F. The exact temperature to which the waxes must be heated will depend upon the specific heat and proportions of waxes and solvents and also upon the temperature of the solvent to which the waxes are added. The temperature of the mixture of the waxes and solvent may vary between 45 and 65° C. but the preferred variation is 58° plus or minus 2° C. The temperature of the solvents or dispersing media before the addition of the waxes should be between 20 and 25° C., although temperatures as high as 35 to 40° C. have produced satisfactory results. If the temperature of the solvent is too high, however, a soft, spongy texture of the finished composition is obtained which exudes solvents readily under slight pressure. Such material also has a poor surface gloss and poor appearance in the container. The preferred range of temperature as indicated is between 20 and 25° C. In mixing the melted waxes with the cold solvent it is preferred to add the waxes to the solvent. Satisfactory results, however, may be obtained by adding the cold solvent to the melted waxes. When such a procedure is used, a somewhat narrower range of temperatures of the solvent and the resulting wax composition exists in which a satisfactory product is obtained. During the mixing operation, thorough agitation to break up the wax crystals formed has been found to produce a material having homogeneous texture.

After the waxes have been mixed with the solvent the mixture is placed in containers in which it is to be dispensed. The cooling of the wax composition in the container is the second important step in the process of the invention. Satisfactory results can only be obtained by blowing a current of cooling media over the surface of the wax in the uncovered container, thus causing a crust to form over the surface of the contents of the container, after which solidification occurs largely from the top down. With the proper mixing of the waxes and the solvent, satisfactory results may be obtained with the cooling media, for example, air as warm as 35° C. However, air at 15° to 20° C. has been found to be more practical from the standpoint of results obtained and convenience of production. Air at too low a temperature will produce too rapid solidification and will result in cracks in the surface of the material in the container, which is, of course, objectionable.

Variations in the temperature to be used for cooling will depend on such factors as the amount of air available and the efficiency and design of the cooling system. Modifications within the spirit of the invention will be readily apparent to those skilled in the art.

By way of further explanation of the invention, and not by way of limitation, the following examples of polishing wax formulations by weight are given:

Example 1

| | |
|---|---|
| Carnauba wax | 16.0 |
| Paraffin | 11.0 |
| Mineral spirits | 70.0 |
| Citrene | 1.0 |
| Oil soluble dye | Trace |

Example 2

| | |
|---|---|
| Carnauba wax | 12.0 |
| Paraffin | 16.0 |
| Mineral spirits | 71.0 |
| Citrene | 1.0 |
| Oil soluble dye | 0.3 |

Example 3

| | |
|---|---|
| Carnauba wax | 12.0 |
| Refined Montan wax | 8.0 |
| White ceresin | 30.0 |
| Mineral spirits | 120.0 |
| Oil soluble dye | 0.5 |

Example 4

| | |
|---|---|
| Carnauba wax | 5.0 |
| I. G. wax "OP" | 20.0 |
| Paraffin | 75.0 |
| Mineral spirits | 150.0 |
| Oil soluble dye | 4.0 |

The process of the invention produces a firmer, more stable and better appearing product than can be obtained by present practices of manufacture. The process also eliminates the necessity for resorting to the use of complex and more costly wax mixtures and solvents in order to manufacture a salable product. The necessity for using turpentine as the solvent for the waxes is eliminated. The use of hydrocarbon type solvents such as gasoline which may be obtained in almost any desired distillation range thus affording greater freedom in the selection of a solvent which will result in a finished product having optimum working properties.

While the process is particularly adapted to wax polishing compositions containing a high percentage of carnauba wax, other waxes or mixtures of waxes may be substituted either wholly or in part for the carnauba wax or carnauba and paraffin mixtures.

Other ingredients may be added to the polishing compositions which may contribute desirable properties without going beyond the scope of the invention. Such materials are, for example, coloring matter, odorants, or other ingredients which may modify the working properties, durability, or luster imparting qualities of the wax. Due to the fact that hydrocarbon solvent of the gasoline type may be used, a wide range of boiling compositions is afforded as indicated above. Ranges with regard to temperatures of the mixing of the ingredients and the cooling of the finished product have been previously discussed.

The process of the invention presents as an advantage the production of a wax polishing composition having a uniform body texture, a smooth and glossy surface in the container in which it is dispensed, and improved general quality.

Another advantage is the production of wax polishing compositions in which less costly aliphatic hydrocarbon solvents may be used in place of the more expensive commonly used spirits of turpentine.

A still further advantage is the ease of production on a manufacturing scale of wax type polishing compositions because of carefully controlled manufacturing conditions.

As many apparently widely different embodiments of this invention may be made without departing from the spirit and scope thereof, it is to be understood that the invention is not limited to the specific embodiments thereof except as defined in the appended claims.

We claim:

1. A process for the preparation of firm, turpentine free wax polishing composition having glossy surfaces which comprises melting a wax or mixture of waxes and heating to such a temperature that when the melted wax is admixed with the cool solvent with agitation, the resulting mixture of waxes and solvent will be only a few degrees above the solidifying point of the mixture incorporating the cool solvent with the said wax and while the mixture is still only a few degrees above the solidifying point pouring into containers and cooling same by blowing a gentle draft of cool air over the surface of the material in the container.

2. The process described in claim 1 in which the temperature of the resulting mixtures of waxes and solvents is between 45 and 65° C.

3. The process described in claim 1 in which the temperature of the solvent at the time of admixture with the melted waxes is less than 35° C.

4. The process described in claim 1 in which the melted waxes are admixed with the cool solvent by pouring the melted waxes into the solvent with agitation.

5. The process described in claim 1 in which the melted waxes are admixed with the cool solvent by pouring the cool solvent into the melted waxes.

6. The process described in claim 1 in which the draft of cooling air blowing over the containers is less than 20° C.

7. A process for the preparation of wax polishing compositions which comprises melting a wax or mixture of waxes and heating to such a temperature that when the melted wax is admixed with a solvent, the temperature of which is between 20 and 25° C. just previous to mixing, the temperature of the resulting mixture of wax and solvent will be between 56 and 60° C., incorporating the solvent and wax and while the mixture is between 56 and 60° C., pouring the wax mixture into containers at this temperature and cooling same by blowing a gentle draft of air, the temperature of which is between 15 and 20° C., over the surface of the uncovered containers until solidification of the wax-solvent mixture has occurred.

8. Process of manufacturing wax polishing compositions which comprises dissolving about 12 parts of carnauba wax, 16 parts of paraffin wax, 1 part of citrene and a small amount of dye in about 71 parts of an aliphatic hydrocarbon solvent, adjusting the temperature of the separate components so that when mixed the mixture will be about 60° C., pouring the same into small containers and passing air over the open containers, the air being maintained between 15° and 20° C.

JOHN D. PICKENS.
THEODORE RICHARD THOMPSON.